United States Patent
Horiuchi

(10) Patent No.: US 11,731,332 B2
(45) Date of Patent: Aug. 22, 2023

(54) STATE DETERMINATION DEVICE AND STATE DETERMINATION METHOD

(71) Applicant: FANUC CORPORATION, Yamanashi (JP)

(72) Inventor: Atsushi Horiuchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 495 days.

(21) Appl. No.: 16/777,887

(22) Filed: Jan. 31, 2020

(65) Prior Publication Data

US 2020/0254670 A1    Aug. 13, 2020

(30) Foreign Application Priority Data

Feb. 7, 2019   (JP) .................... 2019-020411

(51) Int. Cl.
| | | |
|---|---|---|
| *G06N 3/08* | (2023.01) | |
| *G05B 13/02* | (2006.01) | |
| *B29C 45/76* | (2006.01) | |
| *B29C 37/00* | (2006.01) | |
| *G06N 20/00* | (2019.01) | |
| *G06N 3/045* | (2023.01) | |

(52) U.S. Cl.
CPC ........ *B29C 45/768* (2013.01); *B29C 37/0096* (2013.01); *G05B 13/0265* (2013.01); *G06N 3/045* (2023.01); *G06N 3/08* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,121,467 A | 6/1992 | Skeirik | |
| 5,153,149 A | 10/1992 | Naito et al. | |
| 2006/0009874 A1 | 1/2006 | Saito et al. | |
| 2006/0224540 A1 | 10/2006 | Shioiri et al. | |
| 2008/0065356 A1 | 3/2008 | Kato et al. | |
| 2012/0027882 A1* | 2/2012 | Komamura | B29C 45/76 425/169 |
| 2014/0279795 A1* | 9/2014 | Shibuya | G05B 23/0221 706/46 |
| 2016/0330225 A1 | 11/2016 | Kroyzer et al. | |
| 2017/0028593 A1* | 2/2017 | Maruyama | B29C 37/0096 |
| 2017/0293862 A1 | 10/2017 | Kamiya et al. | |
| 2017/0326771 A1 | 11/2017 | Uchiyama | |
| 2017/0330775 A1* | 11/2017 | Shiraishi | G06Q 10/06 |
| 2018/0164781 A1 | 6/2018 | Kubo et al. | |
| 2018/0239345 A1 | 8/2018 | Noda | |

(Continued)

FOREIGN PATENT DOCUMENTS

| | | |
|---|---|---|
| CN | 101837627 A | 9/2010 |
| CN | 102909844 A | 2/2013 |

(Continued)

*Primary Examiner* — Kenneth M Lo
*Assistant Examiner* — Istiaque Ahmed
(74) *Attorney, Agent, or Firm* — Hauptman Ham, LLP

(57) ABSTRACT

A state determination device acquires data on an industrial machine, extracts data used for processing related to machine learning from the acquired data, out of the acquired data, according to an extraction condition for extracting the data, and executes the processing related to the machine learning using the extracted data.

9 Claims, 8 Drawing Sheets

(56) References Cited

U.S. PATENT DOCUMENTS

| | | | |
|---|---|---|---|
| 2018/0306609 A1* | 10/2018 | Agarwal | H04L 67/12 |
| 2019/0210176 A1 | 7/2019 | Yamamoto | |
| 2020/0103862 A1 | 4/2020 | Okubo et al. | |
| 2021/0319368 A1* | 10/2021 | Motegi | G05B 23/0221 |
| 2022/0080646 A1 | 3/2022 | Tomiyama et al. | |

FOREIGN PATENT DOCUMENTS

| | | |
|---|---|---|
| CN | 102999020 A | 3/2013 |
| CN | 107656485 A | 2/2018 |
| CN | 108227633 A | 6/2018 |
| JP | H1-168421 A | 7/1989 |
| JP | 2006281662 A | 10/2006 |
| JP | 2007258731 A | 10/2007 |
| JP | 20089935 A | 1/2008 |
| JP | 200833902 A | 2/2008 |
| JP | 201590535 A | 5/2015 |
| JP | 2015142977 A | 8/2015 |
| JP | 2017-30221 A | 2/2017 |
| JP | 201733472 A | 2/2017 |
| JP | 2017102826 A | 6/2017 |
| JP | 2017-188030 A | 10/2017 |
| JP | 2017-202632 A | 11/2017 |
| JP | 201824055 A | 2/2018 |
| JP | 201873258 A | 5/2018 |
| JP | 2018-97616 A | 6/2018 |
| JP | 202052821 A | 4/2020 |
| SG | 188751 A1 | 4/2013 |
| WO | 2018229881 A1 | 12/2018 |

\* cited by examiner

FIG. 3

| CONDITION CLASSIFICATION | EXTRACTION CONDITIONS |
|---|---|
| MACHINE STATE | EXCLUDE ACQUIRED DATA DURING ALARMING FROM DATA FOR LEARNING |
| MACHINE STATE | EXCLUDE ACQUIRED DATA FOR 30 CYCLES SINCE START OF MOLDING FROM DATA FOR LEARNING |
| MACHINE STATE | EXCLUDE ACQUIRED DATA FOR 40 CYCLES SINCE MOLD CHANGE FROM DATA FOR LEARNING |
| MACHINE STATE | EXCLUDE ACQUIRED DATA AFTER COMPLETION OF PRODUCTION FROM DATA FOR LEARNING |
| OPERATIONAL STATE | EXCLUDE ACQUIRED DATA FOR 10 CYCLES SINCE CHANGE OF INJECTION CONDITIONS FROM DATA FOR LEARNING |
| OPERATIONAL STATE | EXCLUDE ACQUIRED DATA FOR 20 CYCLES SINCE CHANGE OF METERING CONDITIONS FROM DATA FOR LEARNING |
| MOLDING PROCESS | EXTRACT ONLY ACQUIRED DATA IN MOLD CLOSING PROCESS AS DATA FOR LEARNING |
| MOLDING PROCESS | EXTRACT ONLY ACQUIRED DATA IN INJECTION AND PACKING PROCESSES AS DATA FOR LEARNING |

FIG. 8
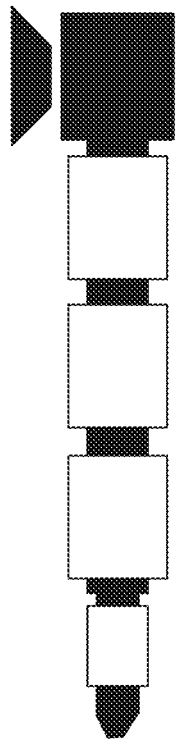
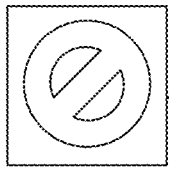

STATE DETERMINATION DEVICE AND STATE DETERMINATION METHOD

RELATED APPLICATIONS

The present application claims priority to Japanese Patent Application Number 2019-020411 filed Feb. 7, 2019, the disclosure of which is hereby incorporated by reference herein in its entirety.

BACKGROUND OF THE INVENTION

Field of the Invention

The present invention relates to a state determination device and a state determination method, and more particularly, to a state determination device and a state determination method for supporting maintenance of injection molding machines.

Description of the Related Art

The maintenance of an industrial machine, such as an injection molding machine, is performed regularly or on the occurrence of an abnormality. In maintaining the industrial machine, maintenance personnel determines the abnormality of the operating state of this industrial machine by using physical quantities indicative of the machine operating state having been recorded during the operation of the machine, and performs maintenance work such as replacement of abnormal components.

For maintenance work for a check valve of an injection cylinder of the injection molding machine, as a kind of the industrial machine, for example, there is a known method in which a screw is regularly removed from the injection cylinder so that the dimensions of the check valve can be measured directly. In this method, however, production must be suspended for the measurement work, so that the productivity is inevitably reduced.

To solve this problem, there is a known method of abnormality diagnosis. In this method, an abnormality is diagnosed by indirectly detecting a wear amount of the check valve of the injection cylinder without suspending the production for the removal of the screw from the injection cylinder or the like. Also, in this diagnosis method, the abnormality is diagnosed by detecting a rotational torque on the screw or a phenomenon of flowing backward of a resin relative to the screw.

For example, Japanese Patent Application Laid-Open No. 01-168421 discloses a method in which a rotational torque influential on a screw rotation method is measured and an abnormality is identified if a tolerance range is exceeded by the measured value. Moreover, Japanese Patent Applications Laid-Open Nos. 2017-030221 and 2017-202632 disclose methods in which an abnormality is diagnosed by supervised learning of a drive part load, resin pressure, and the like. Furthermore, Japanese Patent Applications Laid-Open Nos. 2018-097616 and 2017-188030 disclose a method in which machine learning is performed using time-series data.

However, in an injection molding machine whose drive part includes constituent elements of different specifications, there is a problem that the divergence between measured values obtained from this machine and the numerical values of learning data input during machine learning is so great that diagnosis by the machine learning cannot be performed correctly. Also, a problem arises that if the type of a resin as the raw material of molded articles manufactured by the injection molding machine or the types of a mold, mold temperature controller, resin dryer, and the like, as incidental facilities of the injection molding machine, are different from those used for the machine learning, the diagnosis by the machine learning cannot be performed correctly.

To increase the diagnosis accuracy of the machine learning by solving these problems, it is necessary to prepare a wide variety of learning conditions for the machine learning in creating the learning model of the machine learning. However, the machine learning based on the assortment of a wide variety of injection molding machines, resins, and incidental facilities requires high cost. In addition, the operation of the machine also requires preparation of raw materials such as resins and workpieces, and the cost of the raw materials required for the acquisition of the learning data is also high. Moreover, the work for acquiring the learning data takes much time. Accordingly, there is a problem that the learning data cannot be collected efficiently.

In some cases, time-series data acquired from the injection molding machine may be unsuitable for machine learning immediately after the replacement of a resin as the raw material of molded articles manufactured by the injection molding machine, replacement of molds an incidental facility of the injection molding machine, or start of operation of a peripheral device, such as a mold temperature controller or resin dryer, or of the injection molding machine, or when operation conditions, such as injection conditions or packing conditions, related to the operation of the injection molding machine are changed, or the injection molding machine is in an alarm state in which it does not operate normally. According to the prior art technique, however, there is a problem that the operating state of the machine cannot be diagnosed correctly because even unsuitable learning data are used for performing machine learning to introduce a learning model or the unsuitable learning data are diagnosed.

SUMMARY OF THE INVENTION

Thus, there is a demand for a state determination device and a state determination method capable of easily eliminating unsuitable learning data to perform accurate machine learning and supporting the maintenance of various industrial machines using the result of the learning.

Thereupon, a state determination device and method according to the present invention solve the above problems by introducing a high-accuracy learning model by performing machine learning with time-series data involving changes of the operating or operational state of the injection molding machine or an unstable state for molding, such as time-series data during alarming, time-series data immediately after the start of machine operation or replacement of a mold, or changes of set values of molding conditions, including injection conditions and packing conditions related to the machine operation, excluded from learning data, in connection with the learning data to be input to the machine learning.

A state determination device according to one aspect of the present invention is configured to determine an operating state of an industrial machine and includes a data acquisition unit configured to acquire data on the industrial machine, an extraction condition storage unit configured to store an extraction condition for extracting data used for processing related to machine learning from the data acquired by the data acquisition unit, a learning data extraction unit configured to extract the data used for the processing related to the machine learning, out of the data acquired by the data acquisition unit, according to the extraction condition stored by the extraction condition storage unit, and a machine learning device configured to execute the processing related to the machine learning using the data extracted by the learning data extraction unit.

The machine learning device can comprise a learning unit configured to perform the machine learning using the data extracted by the learning data extraction unit, thereby generating a learning model. Moreover, the learning unit can perform at least one of machine learning modes including supervised learning, unsupervised learning, and reinforcement learning.

The machine learning device can comprise a learning model storage unit configured to store the learning model generated by the machine learning using the data extracted by the learning data extraction unit and an estimation unit configured to perform estimation of the state of the industrial machine using the learning model, based on the data extracted by the learning data extraction unit.

The estimation unit may estimate an abnormality degree related to the operating state of the industrial machine, and the state determination device may display a warning message on a display device if a predetermined threshold is exceeded by the abnormality degree estimated by the estimation unit.

The estimation unit may estimate an abnormality degree related to the operating state of the industrial machine, and the state determination device may display a warning icon on a display device if a predetermined threshold is exceeded by the abnormality degree estimated by the estimation unit.

The estimation unit may estimate an abnormality degree related to the operating state of the industrial machine, and the state determination device may output at least one of commands for suspension of operation, deceleration, and restriction of the torque of a motor to the industrial machine.

The industrial machine may be an injection molding machine, and the data acquired by the learning data extraction unit may include at least one of pieces of information including information for identifying an in-operation state, stop state, temperature rising state, completion of temperature rising, mold change state, completion of mold change, alarming state, or production completion state, indicative of a machine state of the injection molding machine, information for identifying the occurrence of change of an injection condition, packing condition, metering condition, mold opening/closing condition, ejection condition, or temperature condition, representative of an operational state of the injection molding machine, and information for identifying a mold closing process, mold clamping process, injection process, packing process, metering process, mold opening process, ejection process, or standby process, as a molding process of the injection molding machine.

The data acquired by the data acquisition unit may include at least one of data acquired from a plurality of industrial machines connected by a wired/wireless network.

A method related to machine learning in a state determination device for acquiring data on an industrial machine according to another aspect of the present invention includes a data acquisition step for acquiring the data on the industrial machine, a learning data extraction step for extracting data used for processing related to machine learning from the data acquired from the industrial machine, out of the data acquired in the data acquisition step, according to an extraction condition for extracting the data used for the processing related to the machine learning, and a step of executing the processing related to the machine learning using the data extracted in the learning data extraction step.

The present invention, having the structure described above, can perform machine learning with data acquired in case of changes in the operating or operational states of an industrial machine and data acquired in an unstable state for molding excluded, so that an improvement in the determination accuracy of the machine learning can be expected.

BRIEF DESCRIPTION OF THE DRAWINGS

FIG. 3 is a diagram showing examples of extraction conditions;

FIG. 8 is a diagram showing a display example of an abnormal state.

DETAILED DESCRIPTION OF THE PREFERRED EMBODIMENTS

Figure 1:
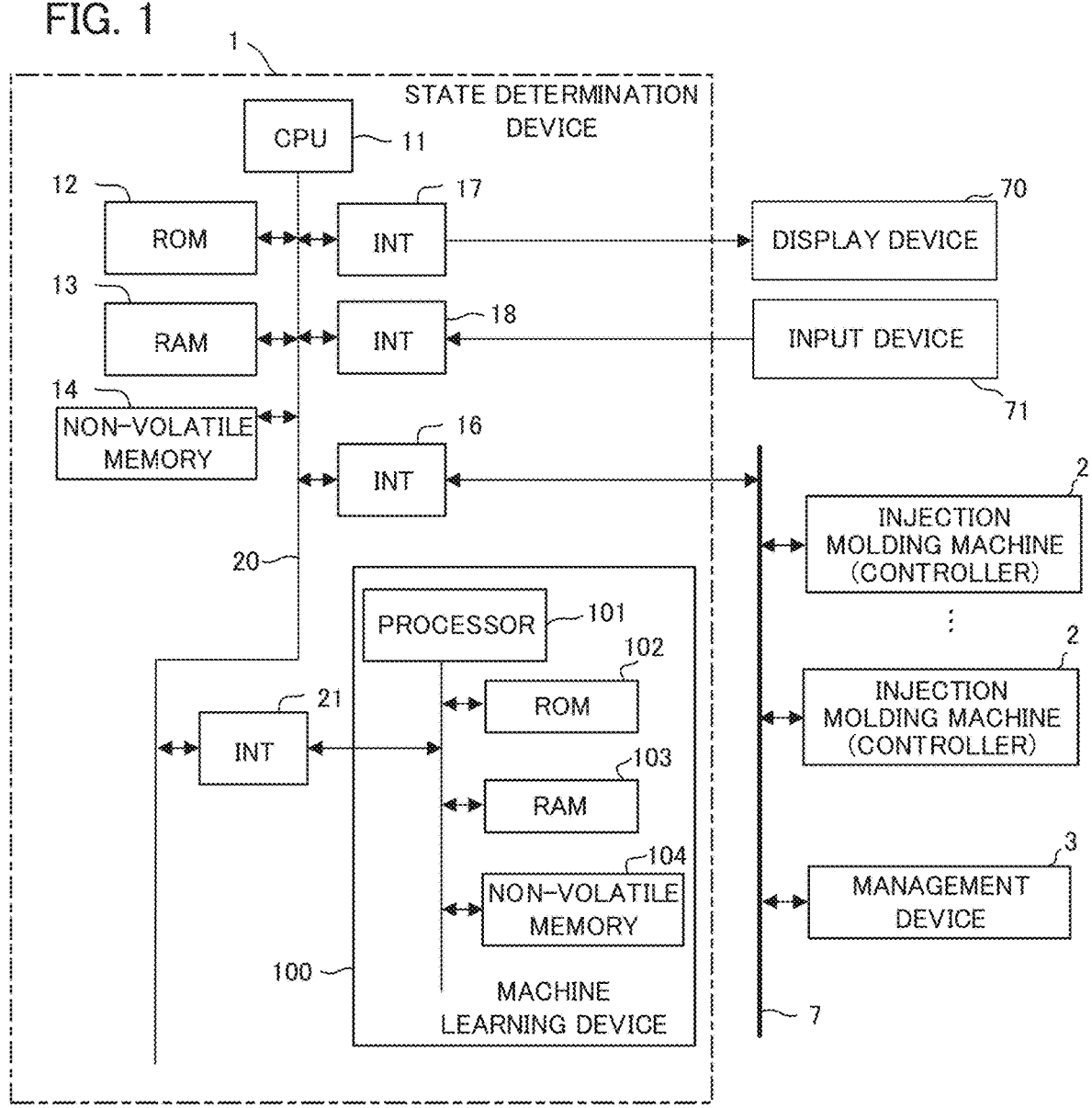
FIG. 1 is a schematic hardware configuration diagram of a state determination device according to one embodiment.

FIG. 1 is a schematic hardware configuration diagram showing principal parts of a state determination device comprising a machine learning device according to one embodiment.

A state determination device 1 of the present embodiment can, for example, be mounted on a controller for controlling industrial machines. Alternatively, it can be implemented as a personal computer adjoined to the controller for controlling the industrial machines, a management device 3 connected to the controller through a wired/wireless network, or a computer such as an edge computer, fog computer, or cloud server. In the following description, the state determination device 1 of the present embodiment will be described as being implemented as the computer connected to the controller for controlling injection molding machines as the industrial machines through the network, by way of example. While an injection molding machine will be described as an industrial machine in each of embodiments described below, the industrial machines as possible objects of state determination by the state determination device 1 of the present invention include an injection molding machine, machine tool, robot, mining machinery, woodworking machinery, agricultural machinery, construction machinery, and the like.

A CPU 11 of the state determination device 1 according to the present embodiment is a processor for generally controlling the state determination device 1. The CPU 11 reads out system programs stored in a ROM 12 via a bus 20 and controls the entire state determination device 1 according to these system programs. A RAM 13 is temporarily loaded with temporary calculation data, various data input by a worker through an input device 71, and the like.

A non-volatile memory 14 is composed of, for example, a memory backed up by a battery (not shown) or an SSD (solid state drive) and its storage state can be maintained even when the state determination device 1 is powered off. The non-volatile memory 14 stores a setting area loaded with setting information on the operation of the state determination device 1, data input from the input device 71, and static data (machine type, mass and material of a mold, resin type, etc.) acquired from injection molding machines 2 through a network 7, time-series data on physical quantities (the temperature of a nozzle, the position, speed, acceleration, current, voltage, and torque of a motor for driving the nozzle, the temperature of the mold, the flow rate, flow velocity, and pressure of the resin, etc.) detected during molding operations of the injection molding machines 2, time-series data of information (information for identifying a mold closing process, mold clamping process, injection process, packing process, metering process, mold opening process, ejection process, cycle start, and cycle end, as molding processes of the injection molding machine 2, information indicative of the state of occurrence of an alarm, etc., data read from other computers through external storage devices (not shown) or the network 7, and the like. The programs and various data stored in the non-volatile memory 14 may be developed in the RAM 13 during execution and use. Moreover, the system programs, including a conventional analysis program for analyzing the various data, a program for controlling exchange with a machine learning device 100 (described later), and the like, are previously written in the ROM 12.

The state determination device 1 is connected to the wired/wireless network 7 through an interface 16. The network 7 is connected with at least one of the injection molding machines 2, the management device 3 for managing manufacturing work by the injection molding machine 2, and the like and exchanges data with the state determination device 1.

Each injection molding machine 2 is a machine configured to manufacture molded articles of a resin such as plastic. The injection molding machine 2 melts the resin as a material and fills (injects) it into the mold to perform molding. The injection molding machine 2 includes various pieces of equipment including the nozzle, the motor, a transmission mechanism, a speed reducer, and the moving part. The states of various parts are detected by sensors or the like and the operations of the various parts are controlled by the controller. For example, an electric motor, oil-hydraulic cylinder, oil-hydraulic motor, or air motor may be used as the motor for the injection molding machine 2. Moreover, a ball screw, gears, pulleys, a belt, and the like may be used for the transmission mechanism for the injection molding machine 2.

Data read onto the memories, data obtained as the result of execution of the programs and the like, data output from the machine learning device 100 (described later), and the like are output through an interface 17 and displayed on a display device 70. Moreover, the input device 71, which is composed of a keyboard, pointing device, and the like, delivers commands, data, and the like based on the worker's operation to the CPU 11 through an interface 18.

An interface 21 serves to connect the state determination device 1 and the machine learning device 100. The machine learning device 100 includes a processor 101, ROM 102, RAM 103, and non-volatile memory 104. The processor 101 serves to control the entire machine learning device 100. The ROM 102 stores the system programs and the like. The RAM 103 serves for temporary storage in each step of processing related to machine learning. The non-volatile memory 104 is used to store learning models and the like. The machine learning device 100 can observe various pieces of information (e.g., various data, such as the type of the injection molding machine 2, the mass and material of the mold, and the type of the resin, and time-series data on various physical quantities, such as the temperature of the nozzle, the position, speed, acceleration, current, voltage, and torque of the motor for driving the nozzle, the temperature of the mold, and the flow rate, flow velocity, and pressure of the resin) that can be acquired by the state determination device 1 through the interface 21. Moreover, the state determination device 1 acquires the result of processing output from the machine learning device 100 and stores, displays, and sends the acquired result to other devices through the network 7 or the like.

Figure 2:
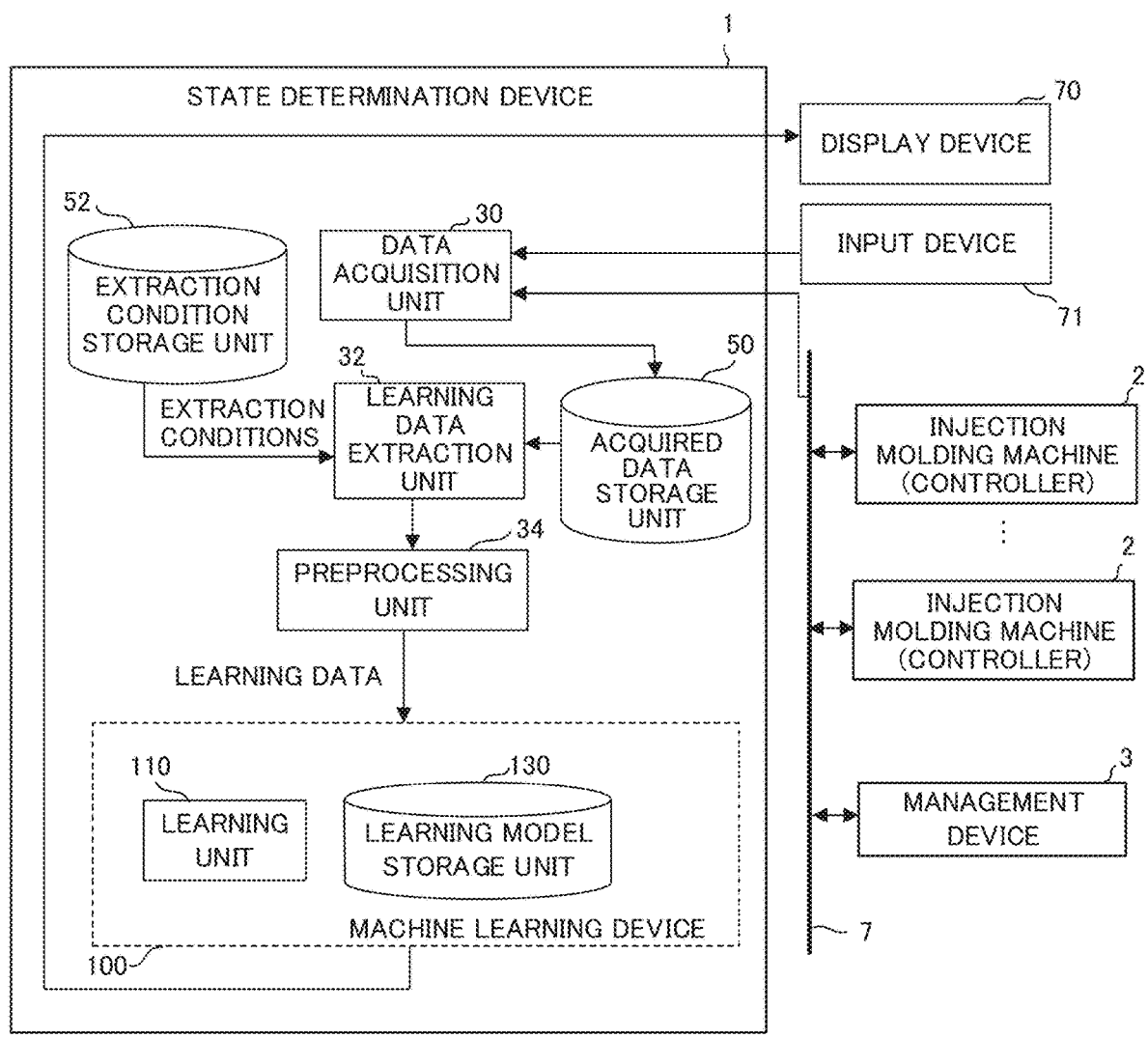
FIG. 2 is a schematic functional block diagram of a state determination device according to a first embodiment.

FIG. 2 is a schematic functional block diagram of the state determination device 1 and the machine learning device 100 according to a first embodiment.

The state determination device 1 of the present embodiment has a structure required when the machine learning device 100 performs learning (learning mode). Each of functional blocks shown in FIG. 2 is implemented as the CPU 11 of the state determination device 1 and the processor 101 of the machine learning device 100 shown in FIG. 1 execute their respective system programs and control operations of the individual parts of the state determination device 1 and the machine learning device 100.

The state determination device 1 of the present embodiment includes a data acquisition unit 30, a learning data extraction unit 32, a preprocessing unit 34, and the machine learning device 100. The machine learning device 100 includes a learning unit 110. Moreover, an acquired data storage unit 50 and an extraction condition storage unit 52 are provided on a non-volatile memory 14 of the state determination device 1. The acquired data storage unit 50 stores data acquired from external machines or the like. The extraction condition storage unit 52 stores conditions for extracting data for learning from the acquired data. A learning model storage unit 130 is provided on the non-volatile memory 104 of the machine learning device 100. The learning model storage unit 130 stores learning models constructed by machine learning by the learning unit 110.

The data acquisition unit 30 acquires various data input from the injection molding machine 2, input device 71, and the like. The data acquisition unit 30 acquires, for example, various pieces of information including static data, such as the type of the injection molding machine 2, the mass and material of the mold, and the type of the resin, time-series data on various physical quantities, such as the temperature of the nozzle, the position, speed, acceleration, current, voltage, and torque of the motor for driving the nozzle, the temperature of the mold related to the molding operation of the injection molding machine 2, and the flow rate, flow velocity, and pressure of the resin, information indicative of machine states of the injection molding machine 2, such as an in-operation state, stop state, temperature rising state, mold change state, completion of mold change, alarming state, production completion state, and the like, information for identifying the occurrence of changes of injection conditions, packing conditions, metering conditions, mold opening/closing conditions, and ejection conditions representative of operational states of the injection molding machine 2, information for identifying a mold closing process, mold clamping process, injection process, packing process, metering process, mold opening process, ejection process, standby process, cycle start, and cycle end, as molding processes of the injection molding machine 2, information indicative of the state of occurrence of an alarm, information on maintenance work for the injection molding machine input by the worker, and the like, and stores these data into the acquired data storage unit 50. In acquiring the time-series data, the data acquisition unit 30 regards the time-series data acquired within a predetermined time range (e.g., range of one-cycle molding processes) as a single time-series data and then stores it in the acquired data storage unit 50, based on changes of signal data acquired from the injection molding machine 2 and other time-series data. The data acquisition unit 30 may be configured to acquire the data from the management device 3 or other computers through the external storage devices (not shown) or the wired/wireless network 7.

In the stage of the machine learning by the learning unit 110, the learning data extraction unit 32 extracts acquired data to be used for the machine learning from the acquired data acquired by the data acquisition unit 30 (and stored in the acquired data storage unit 50), based on the extraction conditions stored in the extraction condition storage unit 52. In other words, the learning data extraction unit 32 excludes unsuitable acquired data for the machine learning from the acquired data acquired by the data acquisition unit 30, based the extraction conditions stored in the extraction condition storage unit 52.

FIG. 3 is a diagram illustrating the extraction conditions stored in the extraction condition storage unit 52.

The extraction condition storage unit 52 stores at least one of the extraction conditions organized and managed by condition classification or the like, for example. The extraction conditions stored by the extraction condition storage unit 52 may be conditions for specifying acquired data to be used for the machine learning or conditions for specifying those acquired data which are not used for (or are excluded from) the machine learning. The extraction conditions stored by the extraction condition storage unit 52 include at least conditions for classifying the acquired data based on predetermined data value included in the acquired data and specification of whether or not to use the acquired data classified by those conditions as data for learning.

Figure 4:
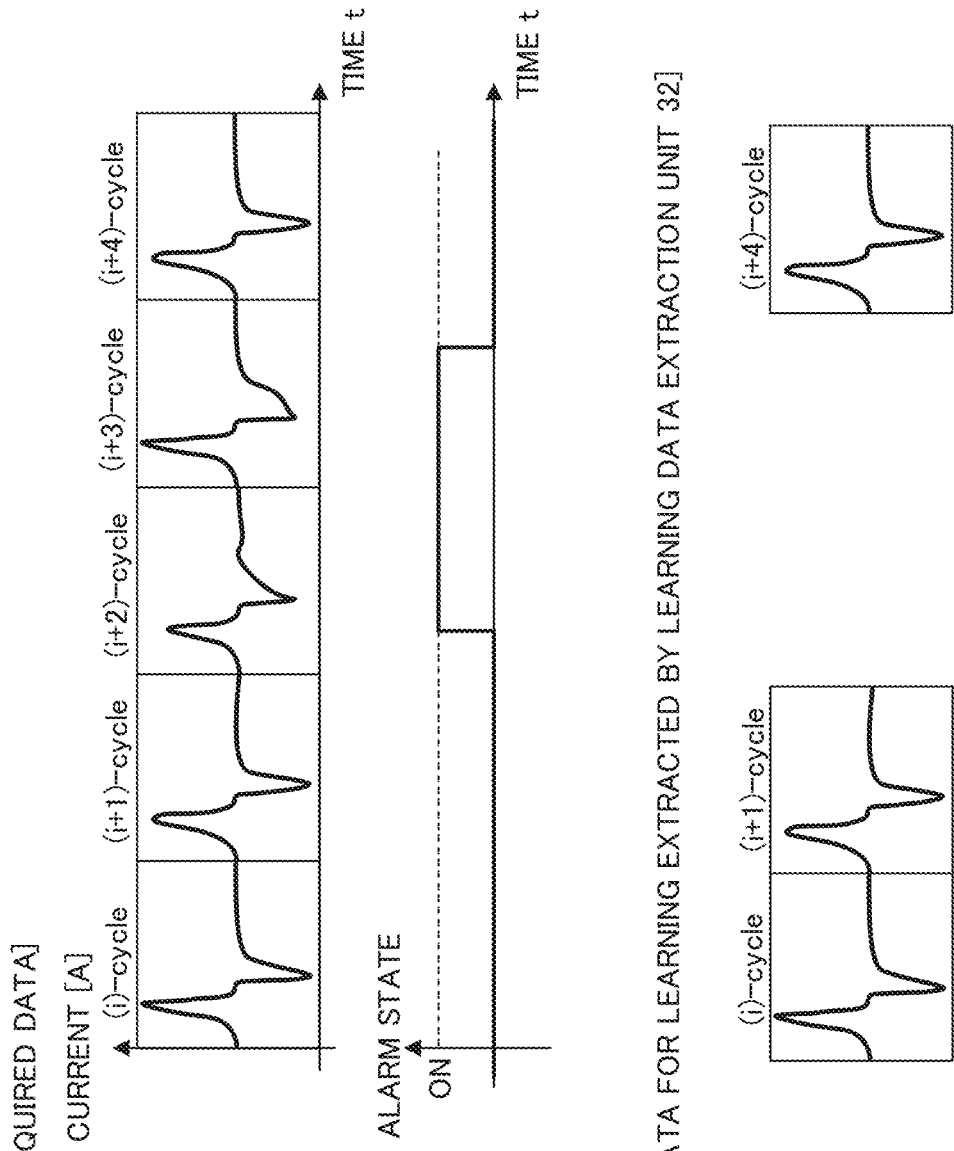
FIG. 4 is a diagram showing an example of extraction of data for learning by a learning data extraction unit.

FIG. 4 is a diagram for illustrating an example of extraction of the acquired data by the learning data extraction unit 32, based on the extraction conditions related to the machine states stored in the extraction condition storage unit 52.

Let us assume a case in which the learning data extraction unit 32 extracts the waveform data of a current value for each cycle as data for learning when the acquired data illustrated in FIG. 4 are stored in the acquired data storage unit 50. In this case, if an extraction condition "exclude acquired data during alarming from data for learning" is set in the extraction condition storage unit 52, the learning data extraction unit 32 operates so as not to extract current value data acquired in the cycle of the molding processes as data for learning when an alarm is generated during the cycle. More specifically, in the case of the example shown in FIG. 4, the learning data extraction unit 32 does not extract data on current values acquired in the (i+2)th and the (1+3)th cycles in which the occurrence of an alarm is detected, as data for learning, but extracts data on current values acquired in and before the (i+1)th cycle and in and after the (i+4)th cycle, as data for learning.

Figure 5:
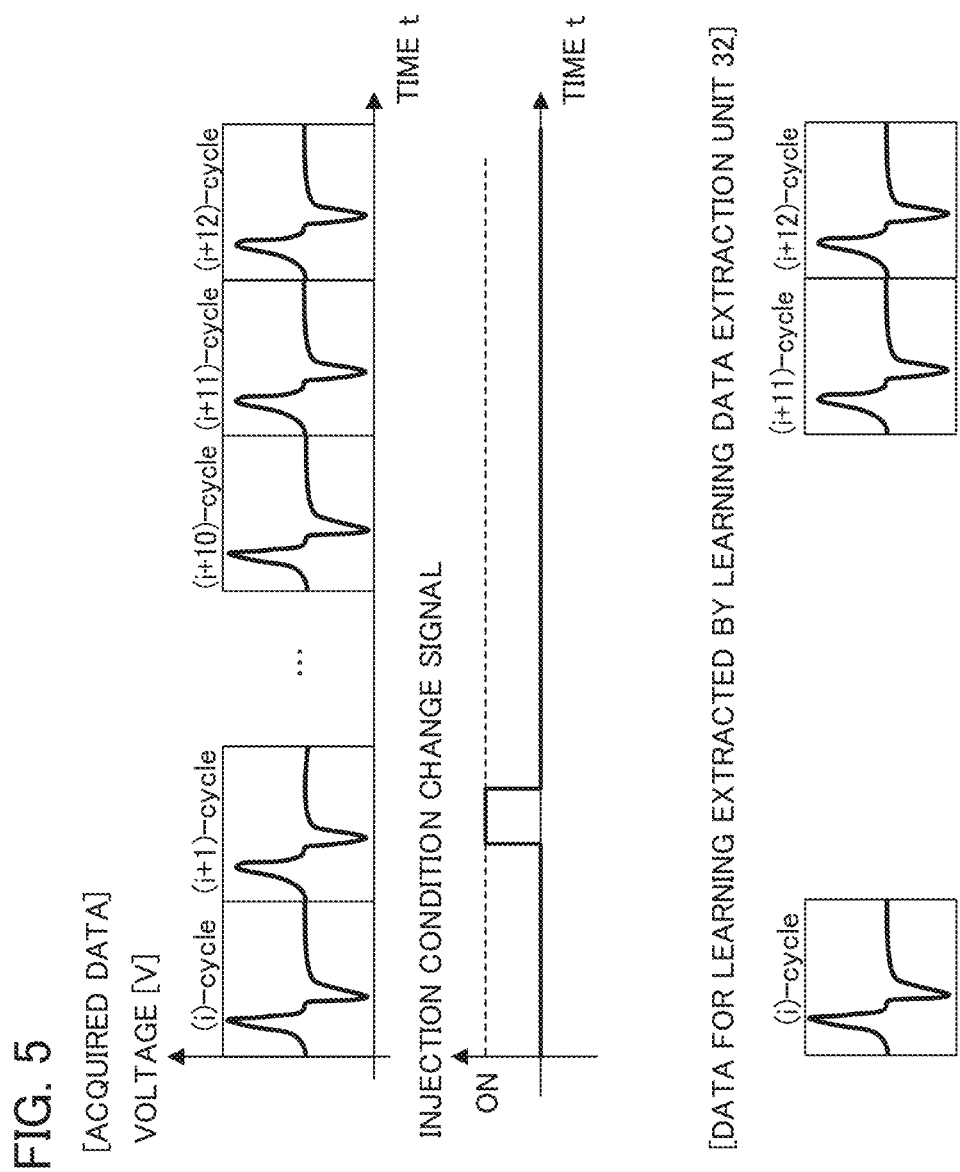
FIG. 5 is a diagram showing another example of the extraction of data for learning by the learning data extraction unit.

FIG. 5 is a diagram for illustrating an example of extraction of the acquired data by the learning data extraction unit 32, based on the extraction conditions related to the operational states stored in the extraction condition storage unit 52.

Let us assume a case in which the learning data extraction unit 32 extracts the waveform data of a voltage value for each cycle as data for learning when the acquired data illustrated in FIG. 5 are stored in the acquired data storage unit 50. In this case, if an extraction condition "exclude acquired data for 10 cycles since change of injection conditions from data for learning" is set in the extraction condition storage unit 52, the learning data extraction unit 32 operates so as not to extract voltage value data acquired during 10 cycles subsequent to a cycle in which the injection conditions are changed as data for learning when the injection condition change is performed (or when an injection condition change signal is turned ON) during molding process cycles. More specifically, in the case of the example shown in FIG. 5, the learning data extraction unit 32 does not extract data on voltage values acquired during 10 cycles (up to the (i+10)th cycle) since the (i+1)th cycle in which the injection conditions are changed, as data for learning, but extracts data on voltage values acquired in and before an i-th cycle and in and after the (i+11)th cycle, as data for learning.

Figure 6:
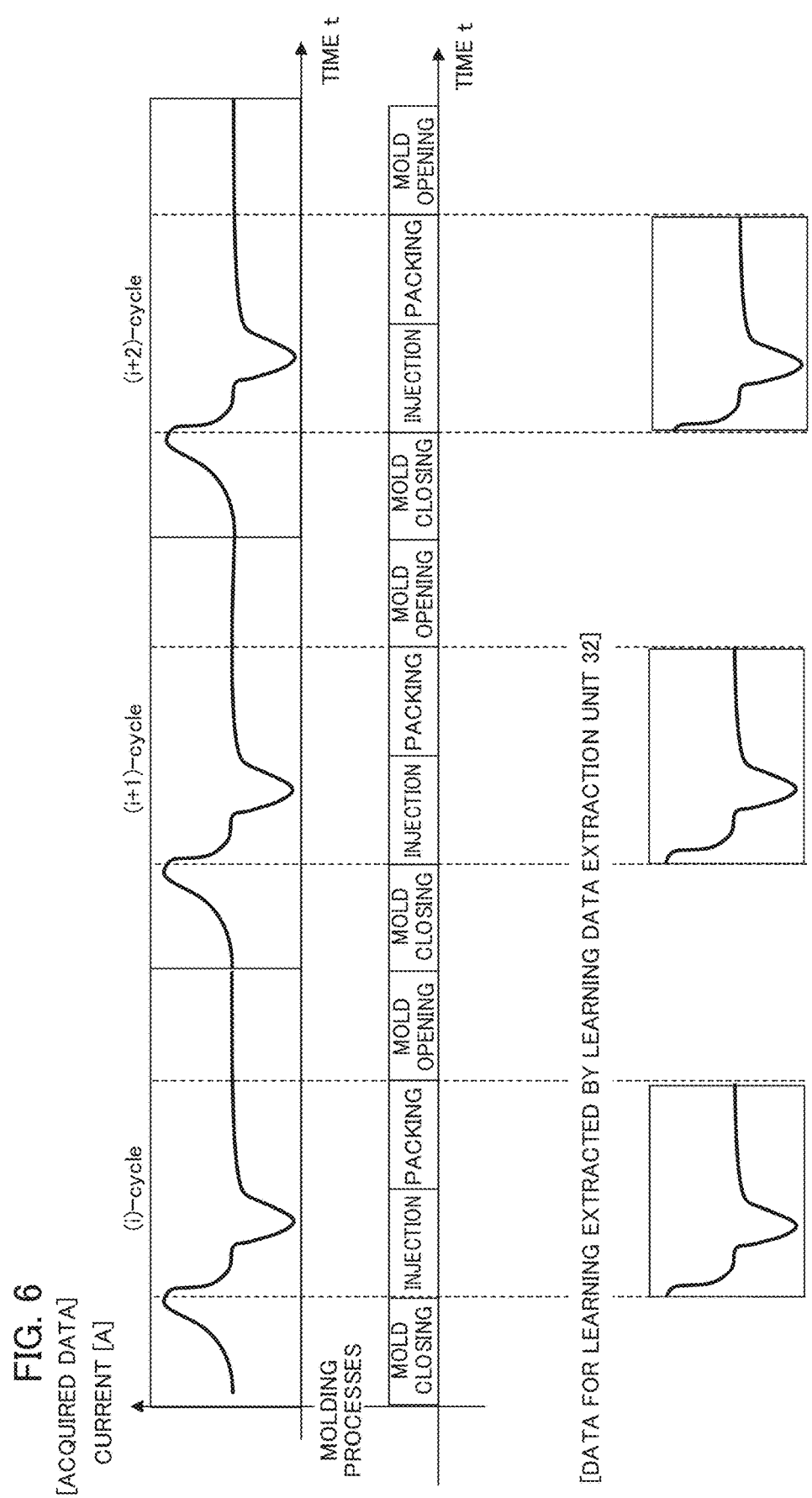
FIG. 6 is a diagram showing another example of the extraction of data for learning by the learning data extraction unit.

FIG. 6 is a diagram for illustrating an example of extraction of the acquired data by the learning data extraction unit 32, based on the extraction conditions related to the molding processes stored in the extraction condition storage unit 52.

Let us assume a case in which the learning data extraction unit 32 extracts the waveform data of a current value for each cycle as data for learning when the acquired data illustrated in FIG. 6 are stored in the acquired data storage unit 50. In this case, if an extraction condition "extract only data acquired in injection and packing processes as data for learning" is set in the extraction condition storage unit 52, then the learning data extraction unit 32 operates so as to extract current value data acquired during the injection and packing processes, out of the individual molding processes, as data for learning. More specifically, in the case of the example shown in FIG. 6, the learning data extraction unit 32 specifies periods for the injection and packing processes, out of the individual molding processes, based on start and end signals in the individual processes, and extracts current value data acquired during these periods as data for learning.

A plurality of extraction conditions can be set in the extraction condition storage unit 52. In this case, conflicts may occur between specifications of use and disuse of two or more extraction conditions as data for learning. Thereupon, the learning data extraction unit 32 may give priority to the specification of disuse as the data for learning. Alternatively, the order of priority between the extraction conditions is previously stored together with extraction conditions in the extraction condition storage unit 52 so that the learning data extraction unit 32 can solve the conflicts by the specification of the use or disuse as the data for learning, based on the stored order of priority.

In the stage of the machine learning by the machine learning device 100, the preprocessing unit 34 creates learning data to be used for the learning by the machine learning device 100 based on the data for learning extracted by the learning data extraction unit 32. The preprocessing unit 34 creates learning data obtained by converting (or quantifying or sampling) data input from the learning data extraction unit 32 into a unified form to be handled in the machine learning device 100. In the case where the machine learning device 100 performs unsupervised learning, for example, the preprocessing unit 34 creates, as the learning data, state data S of a predetermined format in the learning. If the machine learning device 100 performs supervised learning, the preprocessing unit 34 creates, as the learning data, a set of state data S and label data L of a predetermined format in the learning. If the machine learning device 100 performs reinforcement learning, the preprocessing unit 34 creates, as the learning data, a set of state data S and determination data D of a predetermined format in the learning.

The learning unit 110 of the machine learning device 100 performs the machine learning using the learning data created by the preprocessing unit 34 based on the data for learning extracted by the learning data extraction unit 32. The learning unit 110 generates a learning model by performing machine learning using the data acquired from the injection molding machine 2, based on a conventional machine learning method such as the unsupervised learning, supervised learning, or reinforcement learning, and stores the generated learning model in the learning model storage unit 130. The method of the unsupervised learning performed by the learning unit 110 may be represented by, for example, the autoencoder method or k-means method, while the supervised learning method may be represented by, for example, the multilayer perceptron method, recurrent neural network method, long short-term memory method, or convolutional neural network method. The reinforcement learning method may be represented by, for example, the Q-learning method.

The learning unit 110 can perform unsupervised learning based on, for example, learning data obtained by processing of the acquired data acquired from the injection molding machine 2 in a normally operating state, by the learning data extraction unit 32 and the preprocessing unit 34, and generate, as a learning model, the distribution of data acquired in a normal state.

Moreover, the learning unit 110 can, for example, perform supervised learning using learning data obtained by processing of the acquired data by the learning data extraction unit 32 and the preprocessing unit 34 in such a manner that a normal label is applied to the acquired data acquired from the normally operating injection molding machine and an abnormal label is applied to the acquired data acquired from the injection molding machine 2 before and after the occurrence of an abnormality, thereby generating discrimination boundaries between the normal and abnormal data as learning models.

In the state determination device 1 according to the first embodiment having the structure described above, the learning data extraction unit 32 extracts data for learning from acquired data included in the acquired data storage unit 50 acquired from the injection molding machine 2, according to the extraction conditions stored in the extraction condition storage unit 52. The worker can set the extraction conditions in the extraction condition storage unit 52 so that suitable data as the data for learning can be extracted according to the purpose of machine learning at that time. In this way, in connection with the data for learning extracted by the learning data extraction unit 32, it is possible to exclude time-series data involving changes of the operating or operational state of the injection molding machine or an unstable state for molding, such as time-series data during alarming, time-series data immediately after the start of machine operation or replacement of a mold, or changes of set values of molding conditions, including injection conditions and packing conditions related to the machine operation, from learning data, so that only those time-series data which belong to predetermined processes required for the determination of the operating state can be used for machine learning. In the state determination on the injection molding machine 2 using the learning data generated in this manner, the accuracy of determination of the operating state of the injection molding machine 2 can be expected to be improved as compared with the case where a learning model generated by a conventional method is used.

Figure 7:
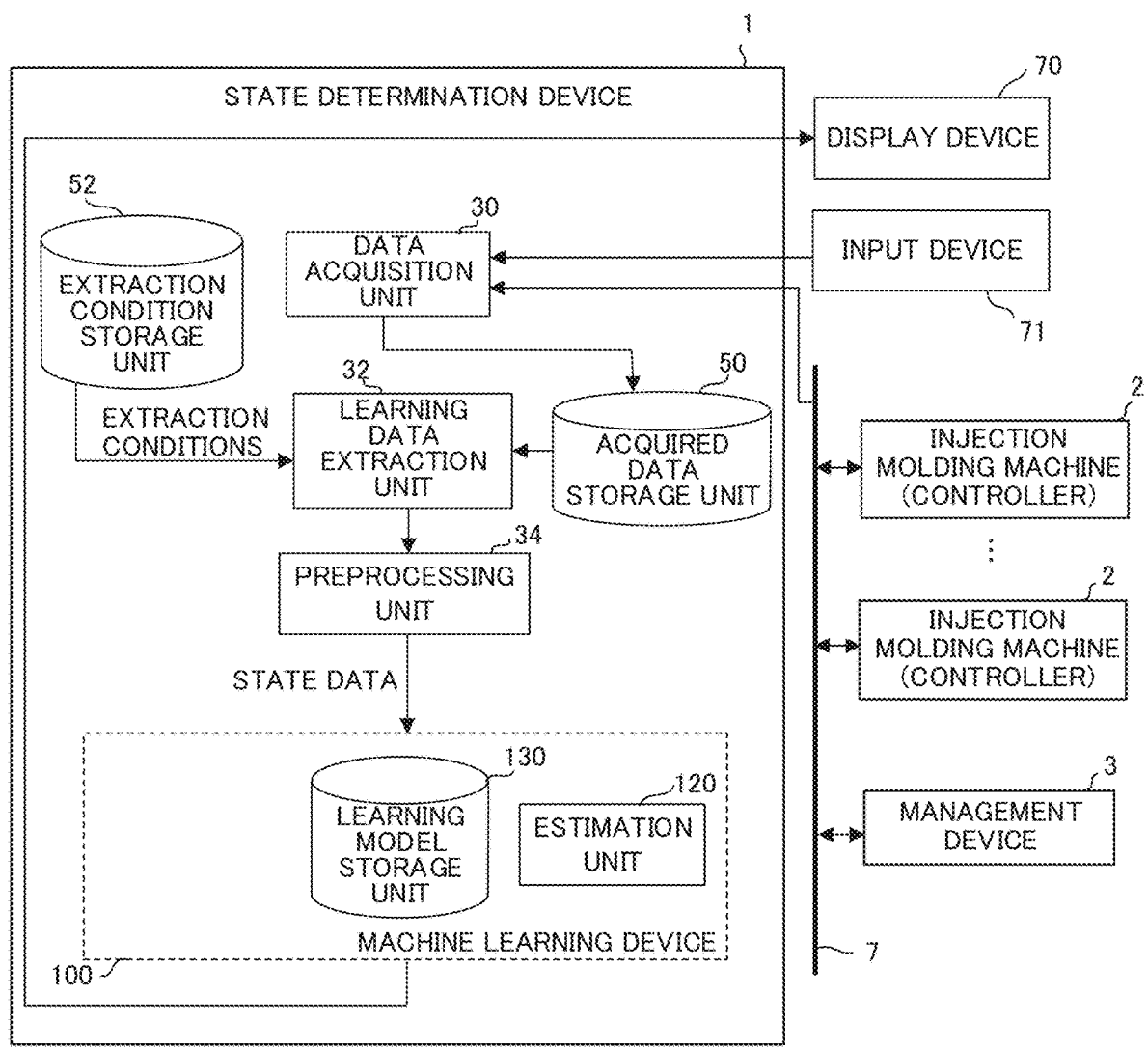
FIG. 7 is a schematic functional block diagram of a state determination device according to a second embodiment.

FIG. 7 is a schematic functional block diagram of a state determination device 1 and a machine learning device 100 according to a second embodiment.

The state determination device 1 of the present embodiment has a structure required when a machine learning device 300 performs estimation (estimation mode). Each of functional blocks shown in FIG. 7 is implemented as the CPU 11 of the state determination device 1 and the processor 101 of the machine learning device 100 shown in FIG. 1 execute their respective system programs and control operations of the individual parts of the state determination device 1 and the machine learning device 100.

The state determination device 1 of the present embodiment, like the first embodiment, includes a data acquisition unit 30, a learning data extraction unit 32, a preprocessing unit 34, and the machine learning device 100. The machine learning device 100 includes the estimation unit 120. Moreover, an acquired data storage unit 50 and an extraction condition storage unit 52 are provided on a non-volatile memory 14 of the state determination device 1. The acquired data storage unit 50 stores data acquired from external machines or the like. The extraction condition storage unit 52 stores conditions for extracting data for learning from the acquired data. A learning model storage unit 130 is provided on the non-volatile memory 104 of this machine learning device 100. The learning model storage unit 130 stores learning models constructed by machine learning by the learning unit 110.

The data acquisition unit 30 according to the present embodiment has the same function as that of the data acquisition unit 30 of the first embodiment.

While the basic operation of the learning data extraction unit 32 according to the present embodiment is the same as that of the learning data extraction unit 32 of the first embodiment, the second embodiment differs from the first embodiment in that data extracted by the learning data extraction unit 32 are data for estimation that are used for the machine learning device 100 to estimate the state of the injection molding machine 2.

In the stage of the estimation of the state of the injection molding machine 2 by the machine learning device 100 using the learning data, the preprocessing unit 34 creates state data S of a predetermined format to be used for the estimation by the machine learning device 100 by converting (or quantifying or sampling) data for estimation estimated by the learning data extraction unit 32 into a unified form to be handled in the machine learning device 100.

Based on the state data S created by the preprocessing unit 34, the estimation unit 120 estimates the state of the injection molding machine using the learning models stored in the learning model storage unit 130. In case where the learning model stored in the learning model storage unit 130 is a learning model generated by unsupervised learning (or for which parameters are settled), the estimation unit 120 of this embodiment inputs the state data S obtained by the preprocessing unit 34 to the learning model, and then estimates the extent of deviation of the state data S from the state data acquired during the normal-state operation, thereby calculating abnormality degree as the result of the estimation. In case where the learning model stored in the learning model storage unit 130 is a learning model generated by supervised learning, on the other hand, the estimation unit 120 of this embodiment inputs the state data obtained by the preprocessing unit 34 to the learning model, thereby estimating and calculating a class (degree of normality or abnormality) to which the operation state of the injection molding machine belongs. The result of the estimation by the estimation unit 120 (the abnormality degree related to the state of the injection molding machine, the class to which the operating state of the injection molding machine belongs, etc.) may be used by being output for display on the display device 70 or output for transmission to a host computer, cloud computer, or the like through a wired/wireless network (not shown). Moreover, if the result of the estimation by the estimation unit 120 proves to be a predetermined state (e.g., if a predetermined threshold is exceeded by the abnormality degree estimated by the estimation unit 120 or if the class to which the operating state of the injection molding machine estimated by the estimation unit 120 belongs is found to be "abnormal"), a warning message and icon may be output for display on the display device 70, as illustrated in FIG. 8, for example, or a command for suspension of operation, deceleration, or restriction of the torque of the motor for driving the injection molding machine may be output to the injection molding machine.

In the state determination device 1 according to the second embodiment having the structure described above, the learning data extraction unit 32 extracts data for estimation from acquired data included in the acquired data storage unit 50 from the injection molding machine 2, according to the extraction conditions stored in the extraction condition storage unit 52. The worker can set the extraction conditions in the extraction condition storage unit 52 so that suitable data as the data for estimation can be extracted according to the purpose of state determination on the injection molding machine 2 at that time. Thus, the data for estimation extracted by the learning data extraction unit 32 are data which does not contain time-series data involving changes of the operating or operational state of the injection molding machine or an unstable state for molding, such as time-series data during alarming, time-series data immediately after the start of machine operation or replacement of molds, or changes of set values of molding conditions, including injection conditions and packing conditions related to the machine operation, so that only suitable time-series data for the determination of the operating state of the injection molding machine 2 can be used for the state determination. Accordingly, the accuracy of determination of the operating state of the injection molding machine 2 by the machine learning can be expected to be improved.

While the state determination devices 1 according to the first and second embodiments described above are applicable to the case in which states related to industrial machines such as robots and machine tools are determined, they can be suitably applied to industrial machines that unstably behave within expectation at the start of manufacture or at the beginning of an operation for resumption of manufacture, for example. An injection molding machine, in particular, often unstably operates within expectation at the start of its operation or immediately after the injection conditions are changed, even when the manufacture is performed in the same injection conditions. Since the operation converges to a stable normal behavior when it is continued without change, this operating state is not regarded as abnormal and fails to be an object of maintenance and inspection. Thus, the state determination device of the present invention is particularly useful for the injection molding machine having such characteristics.

While embodiments of the present invention have been described above, the invention is not limited to the above-described embodiments and may be suitably modified and embodied in various forms.

For example, although the state determination device 1 and the machine learning device 100 are described as being devices that comprise different CPUs (processors) in the above embodiments, the machine learning device 100 may alternatively be implemented by the CPU 11 of the state determination device 1 and the system programs stored in the ROM 12. Moreover, if a plurality of injection molding machines 2 are connected to one another through the network, their respective operating states may be determined by a single state determination device 1 or the state determination device 1 may be mounted on the controller of the injection molding machine.

The invention claimed is:

1. A state determination device for determining an operating state of an industrial machine, the state determination device comprising at least one processor, the at least one processor configured to:
   acquire a single time-series data on the industrial machine, wherein the single time-series data is acquired within a range of one-cycle molding process;
   store an extraction condition for extracting data used for processing related to machine learning from the acquired data, wherein the extraction condition is stored by associating changes of operating or operation state of the industrial machine with a predetermined number of cycles;
   extract the data used for the processing related to the machine learning, out of the acquired data, according to the stored extraction condition; and
   perform the machine learning using the extracted data, thereby generating a learning model.

2. The state determination device according to claim 1, wherein the at least one processor is configured to perform at least one of machine learning modes including supervised learning, unsupervised learning, and reinforcement learning.

3. The state determination device according to claim 1, wherein the at least one processor is configured to store the learning model generated by the machine learning using the extracted data, and the at least one processor is further configured to perform estimation of the state of the industrial machine using the learning model, based on the extracted data.

4. The state determination device according to claim 3, wherein the at least one processor is configured to estimate an abnormality degree related to the operating state of the industrial machine, and the state determination device is configured to display a warning message on a display device in response to the abnormality degree exceeding a predetermined threshold.

5. The state determination device according to claim 3, wherein the at least one processor is configured to estimate an abnormality degree related to the operating state of the industrial machine, and the state determination device is configured to display a warning icon on a display device in response to the abnormality degree exceeding a predetermined threshold.

6. The state determination device according to claim 3, wherein the at least one processor is configured to estimate an abnormality degree related to the operating state of the industrial machine, and the state determination device outputs at least one of commands for suspension of operation, deceleration, and restriction of the torque of a motor to the industrial machine.

7. The state determination device according to claim 1, wherein the industrial machine is an injection molding machine, and the data acquired by the at least one processor include at least one of pieces of information including:

information for identifying an in-operation state, stop state, temperature rising state, completion of temperature rising, mold change state, completion of mold change, alarming state, or production completion state, indicative of a machine state of the injection molding machine;

information for identifying the occurrence of change of an injection condition, packing condition, metering condition, mold opening/closing condition, ejection condition, or temperature condition, representative of an operational state of the injection molding machine; and information for identifying a mold closing process, mold clamping process, injection process, packing process, metering process, mold opening process, ejection process, or standby process, as a molding process of the injection molding machine.

8. The state determination device according to claim 1, wherein the data acquired by the processor include at least one of data acquired from a plurality of industrial machines connected by a wired/wireless network.

9. A method related to machine learning in a state determination device of determining an operating state of an industrial machine, the state determination method comprising:

acquiring a single time-series data on the industrial machine, wherein the single time-series data is acquired within a range of one-cycle molding process;

extracting data used for processing related to machine learning from the data acquired from the industrial machine, out of the data acquired on the industrial machine, according to an extraction condition for extracting the data used for the processing related to the machine learning, wherein the extraction condition associates changes of operating or operation state of the industrial machine with a predetermined number of cycles; and performing the machine learning using the extracted data, thereby generating a learning model.

* * * * *